United States Patent
Addy

(10) Patent No.: US 9,414,180 B2
(45) Date of Patent: Aug. 9, 2016

(54) FIXED MOBILE CONVERGENCE HOME CONTROL SYSTEM

(71) Applicant: HONEYWELL INTERNATIONAL INC., Morristown, NJ (US)

(72) Inventor: Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 144 days.

(21) Appl. No.: 13/951,819

(22) Filed: Jul. 26, 2013

(65) Prior Publication Data

US 2013/0309992 A1    Nov. 21, 2013

Related U.S. Application Data

(63) Continuation of application No. 12/494,662, filed on Jun. 30, 2009, now Pat. No. 8,538,407.

(51) Int. Cl.
*H04M 11/04* (2006.01)
*G08B 1/08* (2006.01)
(Continued)

(52) U.S. Cl.
CPC ............. *H04W 4/001* (2013.01); *G05B 15/02* (2013.01); *G05B 19/0426* (2013.01); *H04L 12/2818* (2013.01); *H04L 12/2836* (2013.01); *H04L 12/66* (2013.01); *H04W 4/22* (2013.01); *H04W 76/007* (2013.01); *H04W 84/045* (2013.01)

(58) Field of Classification Search
CPC ..... G08B 25/10; G08B 26/007; H04W 84/18; H04W 88/16; H04W 84/12; H04W 88/04; H04W 88/08; H04W 84/045; H04W 4/22; H04W 76/007; H04W 48/20; H04W 88/06; A61B 2560/0271; A61B 5/002; A61B 5/0022
USPC ................... 340/3.1, 539.22, 539.23, 539.24, 340/539.25, 539.26, 539.27, 539.28, 340/539.29, 540, 545.1, 546, 545.3, 545.6; 455/418, 419, 420, 404.1; 370/338
See application file for complete search history.

(56) References Cited

U.S. PATENT DOCUMENTS 5,963,624 A    10/1999   Pope
6,243,010 B1    6/2001   Addy et al.
(Continued)

FOREIGN PATENT DOCUMENTS

CN    1512719 A    7/2004
CN    1622567 A    6/2005
(Continued)

OTHER PUBLICATIONS

English-language abstract for Foreign Patent document CN 1971627A.
(Continued)

*Primary Examiner* — Olumide T Ajibade Akonai
(74) *Attorney, Agent, or Firm* — Husch Blackwell LLP

(57) ABSTRACT

Systems and methods for controlling a building automation system with an FMC cellular device are provided. The FMC cellular device can locally interface with a building automation system via a femtocell base station or a wireless access point, remotely interface with a building automation system over a wide area network via a macrocell base station, or remotely interface with a building automation system via a GAN enabled wireless access point.

18 Claims, 3 Drawing Sheets

(51) Int. Cl.
*H04W 4/00* (2009.01)
*G05B 15/02* (2006.01)
*G05B 19/042* (2006.01)
*H04L 12/28* (2006.01)
*H04L 12/66* (2006.01)
*H04W 76/00* (2009.01)
*H04W 84/04* (2009.01)
*H04W 4/22* (2009.01)

(56) References Cited

U.S. PATENT DOCUMENTS

| | | |
|---|---|---|
| 6,801,777 B2 | 10/2004 | Rusch |
| 7,205,892 B2 | 4/2007 | Luebke et al. |
| 7,411,494 B2 | 8/2008 | Kates |
| 7,515,575 B1 | 4/2009 | Shi et al. |
| 7,542,455 B2 | 6/2009 | Grayson et al. |
| 7,796,572 B2 | 9/2010 | Do et al. |
| 7,843,865 B2 | 11/2010 | Kumar |
| 7,869,824 B2 | 1/2011 | Min |
| 8,041,335 B2 | 10/2011 | Khetawat et al. |
| 2001/0021884 A1 | 9/2001 | Shinyagaito |
| 2002/0111157 A1 | 8/2002 | Stieber et al. |
| 2002/0131569 A1 | 9/2002 | Ito et al. |
| 2007/0097939 A1 | 5/2007 | Nylander et al. |
| 2008/0183307 A1 | 7/2008 | Clayton et al. |
| 2008/0191893 A1 | 8/2008 | Li et al. |
| 2009/0045939 A1* | 2/2009 | Holland et al. ............... 340/524 |
| 2009/0082010 A1 | 3/2009 | Lee et al. |
| 2009/0092096 A1 | 4/2009 | Czaja et al. |
| 2009/0191839 A1 | 7/2009 | Cannon, Jr. |
| 2009/0274104 A1 | 11/2009 | Addy |
| 2009/0289757 A1 | 11/2009 | Ballard |
| 2009/0291630 A1 | 11/2009 | Dunn et al. |
| 2011/0171928 A1 | 7/2011 | Vikberg et al. |

FOREIGN PATENT DOCUMENTS

| | | |
|---|---|---|
| CN | 1971627 A | 5/2007 |
| CN | 101262656 A | 9/2008 |
| WO | WO 2008/097992 A1 | 8/2009 |

OTHER PUBLICATIONS

English-language abstract for Foreign Patent document CN 1512719A.
English-language abstract for Foreign Patent document CN 1622567A.
English-language abstract for Foreign Patent document CN 101262656A.
Office Action for corresponding Chinese patent application No. CN 201010265708.1 dated Mar. 11, 2014 (with English translation).
Search Report for corresponding Chinese patent application No. CN 201010265708.1 dated Mar. 11, 2014 (with English translation).
European Search Report dated Apr. 2, 2012, for corresponding EP patent application EP 10167102.2.
Dagfinn Birkeland, UMA/GAN, Adding WiFi Access to the seamless GSM user experience, Norsk UMTS-forum, Jan. 24, 2007, pp. 11-13.
Sudhir Dixit et al., Technology for Home Networking, Dec. 31, 2008, pp. 11-12, 81-88 and 127-128, Wiley-Interscience, John Wiley & Sons, Inc.
U.S. Appl. 61/097,585, filed Sep. 17, 2008, First Named Inventor Jari Vikberg, made available under the PCT for application PCT/SE2008/051395.

* cited by examiner

FIXED MOBILE CONVERGENCE HOME CONTROL SYSTEM

CROSS-REFERENCE TO RELATED APPLICATION

The present application is a continuation of U.S. patent application Ser. No. 12/494,662 filed Jun. 30, 2009, entitled "Fixed Mobile Convergence Home Control System" and incorporated herein by reference.

FIELD OF INVENTION

The present invention relates to building automation systems. More particularly, the present invention relates to systems and methods of remotely controlling a building automation system with a standard fixed mobile convergence (FMC) cellular device.

BACKGROUND

Many buildings today incorporate a building control or automation system. Building control or automation systems could be a security system, an HVAC system, or a home entertainment system, for example. By incorporating communication technology, building control systems can provide a user with real time alerts regarding the status of the monitored building. Similarly, building control systems can receive commands from a user via communication technology.

Signals and commands can be transmitted to and from a controller and/or sensor of the building automation system to a control panel of the system. Similarly, components of the system can communicate with a user via a remote control. Remote controls known to those of skill in the art can use infrared, radio, or other wireless technology, for example, to issue commands and receive or send signals. Remote control devices may be one-way or two-way as desired.

However, traditional remote control devices used in home control systems are proprietary, expensive, and may not provide an optimal user experience. It would be desirable to interface with, monitor, and control a home automation system without the use of such a remote control. It would be most desirable to interface with, monitor, and control a home automation system with the use of standard FMC cellular device.

There is thus a continuing, ongoing need for systems and methods of remotely controlling a building control or automation system with a standard FMC cellular device. Preferably, such systems and methods interface the FMC cellular device with the building automation system via Generic Access Network (GAN) enabled access points.

DETAILED DESCRIPTION OF THE PREFERRED EMBODIMENTS

Figure 1:
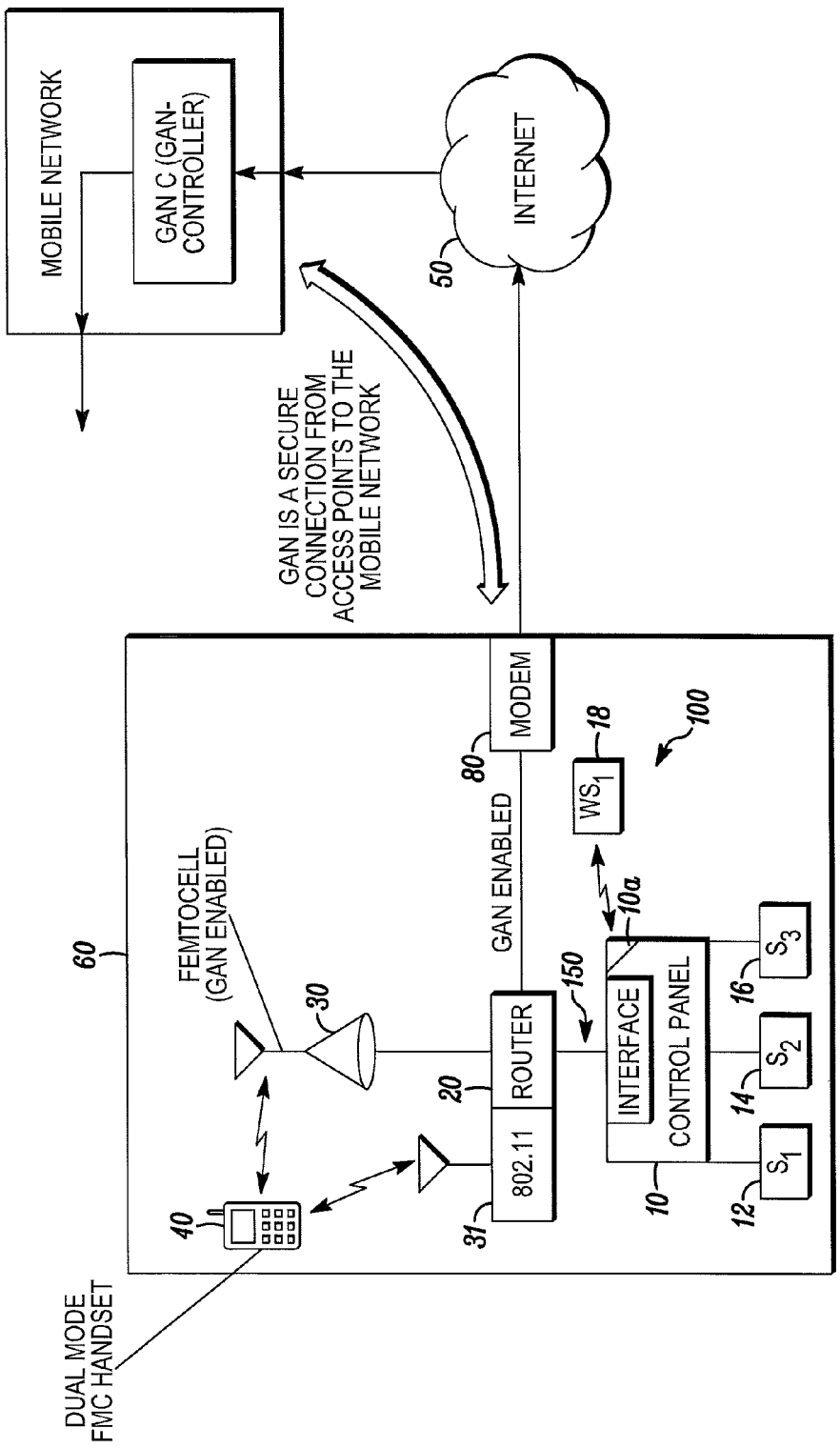
FIG. 1 is a schematic diagram of an FMC cellular device locally interfacing with a home automation system via a femtocell base station or wireless access point, according to an exemplary embodiment of the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include systems and methods of remotely controlling a building control or automation system with a standard FMC cellular device. Preferably, such systems and methods interface the FMC cellular device with the building automation system via femtocells, wireless access points (WAPs) and/or cellular base stations.

In accordance with systems and methods of the present invention, fixed-mobile convergence (FMC) technology is employed to connect a mobile or cellular device to a fixed network. Systems that incorporate FMC technology are advantageous because end users can connect and communicate via the lowest cost network available.

Femtocells can deliver the benefits of FMC technology by acting as an interface between a cellular device and a fixed network. A femtocell is a very low power cellular base station that can be located within a building or a home and can act as the building or home base station.

Femtocell technology enables a cellular device to connect to a fixed network via a broadband connection rather than via a traditional cellular network connection. This is advantageous because data transport is often more expensive over a cellular network connection as compared to a broadband connection. Additionally, coverage within buildings or where radio propagation is difficult is improved with femtocells and/or smaller cells by allowing a cellular carrier to re-use channels more effectively.

In embodiments of the present invention, a femtocell base station can include base station functionality as well as means to communicate with a fixed network such as the Internet. To access the Internet, a femtocell base station can be connected to a broadband modem or can incorporate an Ethernet or equivalent port to communicate with a fixed network.

A fixed network as explained and described herein is any network system that is accessible via physical connections installed in a structure. For instance, the Internet is a fixed network because at some point, there is a physical connection to the network of an Internet service provider's network (ISP). Thus, fixed networks can include ISP networks, telecommunication operator's core networks, local area networks (LAN), wide area networks (WAN), and other networks as known by those of skill in the art.

In accordance with embodiments of the present invention, an FMC cellular device can include at least one, and preferably two, transceivers. The transceivers may be cellular or Wi-Fi® transceivers. Further, at least one component of a building control system can include a transceiver that is capable of wireless and/or wired communication on a fixed local network. A router can be employed in the building control system to enable communication between multiple components of the system.

Wireless access points (WAPs) can also deliver the benefits of FMC technology by acting as an interface between an FMC cellular device and a fixed network. A WAP base station is a very low power Wi-Fi® base station that can be located within a building or a home and can act as the wireless connection into the building or home local area network (LAN).

FIG. 1 illustrates a schematic diagram of an FMC cellular device 40 interfacing with a home automation system 100 via a femtocell base station 30 or LAN wireless access point 31 according to an exemplary embodiment of the present invention. As seen in FIG. 1, the LAN wireless access point 31 is an 802.11 Wi-Fi® enabled router, but the LAN wireless access point 31 could be any LAN wireless access point as known by those of ordinary skill in the art.

The home automation system 100 includes a control panel 10, a router 20, and a plurality of sensors and/or controllers 12, 14, 16. In embodiments of the present invention, the home automation system 100 could also include a wireless sensor/controller 18. Components of the home automation system 100 can be connected to one another on a fixed network 150, for example, a local area network.

As seen in FIG. 1, the home automation system 100, the femtocell base station 30, and the cellular device 40 can be located in a building 60. The control panel 10 can communicate with the sensors 12, 14, 16 of the system 100 via a sensor bus or direct wired connection, and the control panel 10 can communicate with a router 20 via a local fixed network 150. The wireless sensor 18 can be coupled to the control panel 10 via a transceiver 10a of the control panel 10.

The router 20 can communicate with the femtocell base station 30 over the local fixed network 150. The femtocell base station 30 acts as a base station to the cellular device 40 and provides the cellular device 40 with access to the home automation system 100 for monitoring or controlling the system 100.

The router 20 can also communicate with the wireless access point (WAP) 31 over the local fixed network 150. The WAP 31 acts as a base station to the Wi-Fi® connection of the FMC cellular device 40 and provides the FMC cellular device 40 with access to the home automation system 100 for monitoring or controlling the system 100.

In systems and methods of the present invention, at least one of the sensors 12, 14, 16, the wireless sensor 18, or the control panel 10 can generate an alert signal. Sensors and alert signals can be any type of sensor or signal as would be known by those of skill in the art.

The alert signal or message can be triggered by an event detected by a sensor 12, 14, 16, or 18, or the control panel 10, or the alert message can be periodically generated to report that no new events have been detected. For example, one of the sensors 12 could be a smoke or gas detector, for example, a carbon monoxide (CO) detector. If the sensor 12 detects a dangerous level of CO, the sensor 12 could generate an alert signal to be transmitted to the control panel 10.

Alternatively, the control panel 10 can periodically generate an alert signal to indicate the status or any change in status of the building 60. For example, one of the sensors 14 could be a door alarm sensor or a glass break detector. A user can activate a door alarm sensor 14 by entering or leaving the building 60 and can arm or disarm the security system by typing in a code on a keypad or touch screen. The activation of the door alarm sensor 14 could trigger the control panel 10 to generate an alert signal that the door alarm sensor 14 has been activated or deactivated, or that the system has been placed in an armed or disarmed state.

In embodiments of the invention, an alert signal can include event-related data recorded by a user. For example, one of the sensors 16 could be a motion-sensing camera or motion detector that transmits an alert signal to the control panel 10 including video footage from the camera 16. Other multimedia information can be transmitted as part of the alert message as would be known by those of skill in the art.

The router 20 can be a standard IP router and/or gateway as known by those of ordinary skill in the art, and can communicate with the femtocell base station 30 or WAP 31. The router 20 can also be connected to the Internet 50 via a broadband modem 80, for example.

In some embodiments of the present invention, when the control panel 10 generates or receives an alert signal, the control panel 10 transmits the alert signal to the router 20. The router 20 transmits the alert signal to the femtocell base station 30, and the femtocell base station 30 transmits the alert signal to the cellular device 40 via, for example, radio waves. Communication between the femtocell base station 30 and the cellular device 40 can employ cellular technology as known by those of skill in the art, for example, GPRS, CDMA, or the like.

In other embodiments of the present invention, when the control panel 10 generates or receives an alert signal, the control panel 10 transmits the alert signal to the router 20. The router 20 then transmits the alert signal to the WAP 31, and the WAP 31 transmits the alert signal to the cellular device 40 via, for example, radio waves. Communication between the WAP 31 and the cellular device 40 can employ Wi-Fi® technology as known by those of skill in the art, for example, the 802.11 standard or the like.

In some embodiments of the present invention, a handset of the cellular device 40 can be programmed to dial a phantom or local phone number. The building automation system 100 can then monitor or "snoop" the data transmitted from the femtocell base station 30 or WAP 31 to the system 100. Responsive thereto, the control panel 10 can transmit commands to the cellular device 40 via the femtocell base station 30 or the WAP 31 as short messaging service (SMS) or data, for example.

The handset of the cellular device 40 can display data and messages received related to the building automation system status, for example. In some embodiments, the femtocell base station 30 or the WAP 31 can be part of the home automation system 100 so that the system 100 can directly interface with the cellular device 40.

Figure 2:
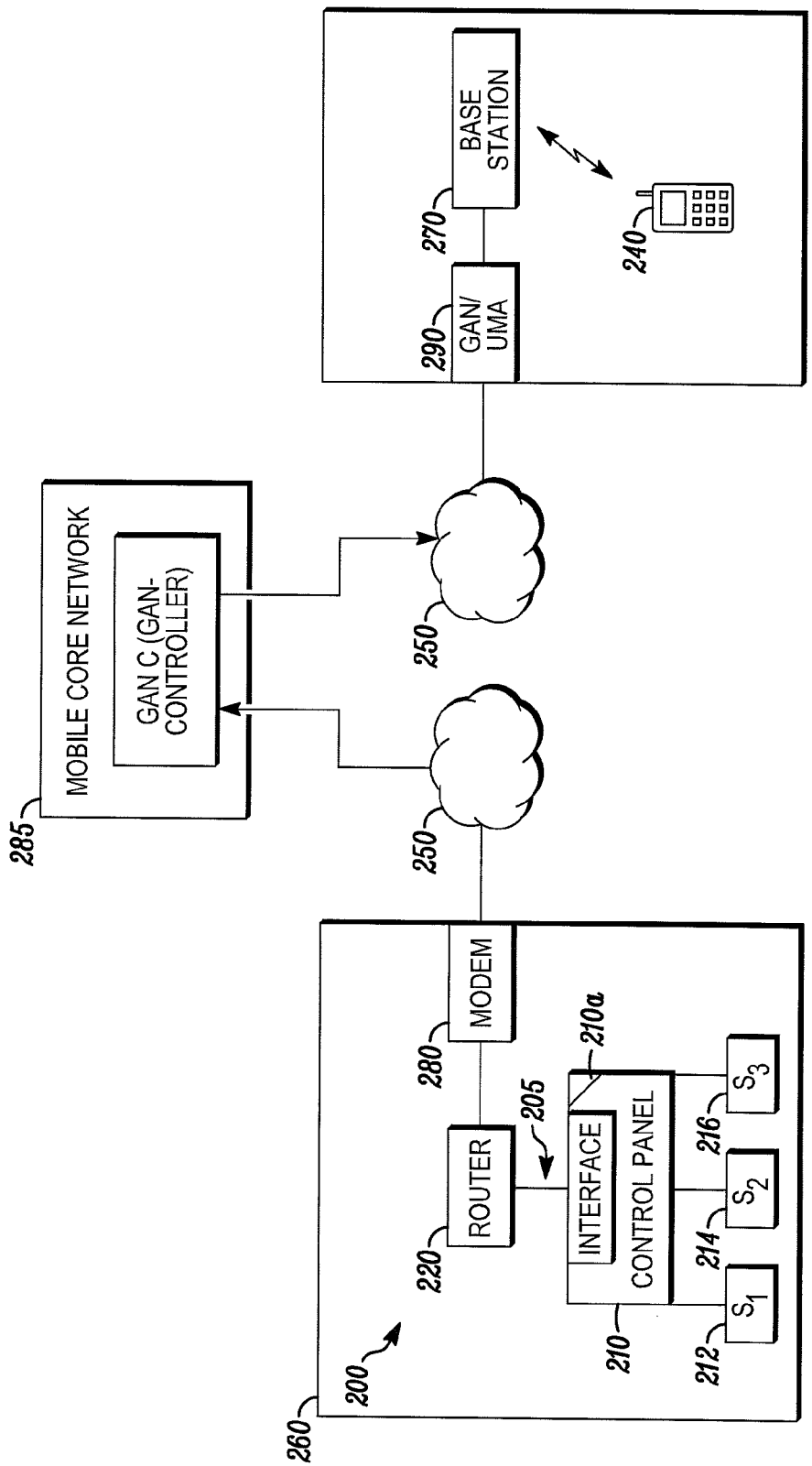
FIG. 2 is a schematic diagram of a cellular device interfacing with a home automation system over a wide area network via a macrocell base station on a mobile network, according to an exemplary embodiment of the present invention.

With respect to wide area operation, FIG. 2 illustrates a schematic diagram of a cellular device 240 interfacing with a home automation system 200 over a wide area via a macrocell base station 270 on a mobile network according to an exemplary embodiment of the present invention. A macrocell base station is a standard cellular base station employed by cellular network operators. Macrocell base stations can comprise a base station controller, an antenna, and a radio network controller, wherein the radio network controller carries out radio resource management and connects to the core network.

As seen in FIG. 2, the home automation system 200 includes a control panel 210, a router 220, and a plurality of sensors and/or controllers 212, 214, 216. Components of the home automation system 200 can be located in a building 260 and connected to one another on a fixed network 205, for example, a local area network. The sensors 212, 214, 216 can communicate with the control panel 210 via a sensor bus or a direct wired connection, and the control panel 210 can also communicate with a router 220 via a local fixed network 205 and an interface of the control panel 210.

The router 220 can communicate with a remotely located macrocell base station 270; the router 220 is coupled to a broadband modem 280, and the macrocell base station 270 is coupled to the mobile core network 285 and therefore, to a GAN/UMA interface 290. Both the broadband modem 280 and the GAN/UMA interface 290 are interconnected via the mobile core network 285 and the Internet 250. Communication between the router 220 and the macrocell base station 270 can occur over the Internet 250.

Figure 3:
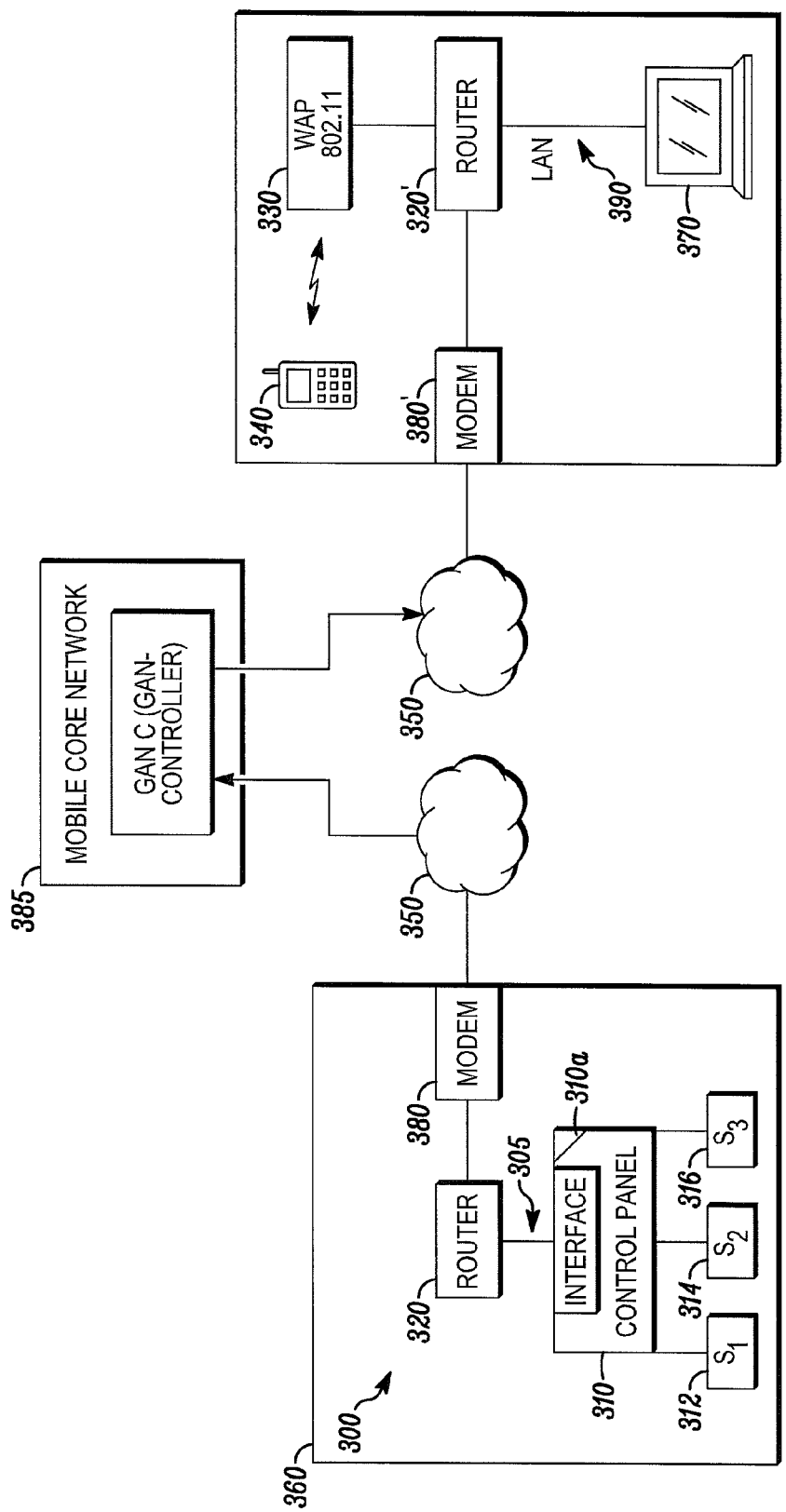
FIG. 3 is a schematic diagram of an FMC cellular device interfacing with a home automation system via a GAN enabled wireless access point, according to an exemplary embodiment of the present invention.

FIG. 3 is a schematic diagram of an FMC cellular device 340 interfacing with a home automation system 300 via a remote WAP 330 over a wide area network using GAN enabled technology, according to an exemplary embodiment of the present invention. The home automation system 300 includes a control panel 310, a router 310, and a plurality of sensors 312, 314, and 316. Components of the home automation system 300 can be located in a building 360 and connected to one another on a fixed network 305, for example, a local area network. The sensors 312, 314, and 316 can communicate with the control panel 310 via a sensor bus or direct wired connection, and the control panel 310 can also communicate with a router 320 via a local fixed network 305 and an interface of the control panel 310.

The router 320 can communicate with a remotely located WAP 330 via the Internet 350; the router 320 is coupled to a first broadband modem 380, and the WAP 330 is coupled to a second broadband modem 380' via a router 320'. The first and second broadband modems 380 and 380' can be coupled to one another via the Internet 350 and a mobile core network 385. In embodiments of the present invention, the WAP 330 is an 802.11 access point.

The WAP 330 can also be coupled to a wired device 370, for example, a personal computer via a LAN 390 and the router 320'. The WAP 330 can act as a base station to the FMC cellular device 340 and provide the FMC cellular device 340 with access to the home automation system 300 via the Internet 350 and a GAN controller of the mobile core network 385.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the spirit and scope of the claims.

What is claimed is:

1. A system comprising:
   a building control system of a building;
   a femtocell cellular base station located within the building;
   a wireless access point (WAP) located within the building operating under an IEEE 802.11 protocol; and
   a cellular device, wherein the building control system communicates on a fixed local network,
   wherein the femtocell cellular base station and the WAP are coupled directly to the fixed local network via a local router,
   wherein the cellular device controls the building control system by interfacing with the fixed local network via the femtocell cellular base station,
   wherein the cellular device alternatively controls the building control system by interfacing with the fixed local network via the WAP, and
   wherein data transmitted from the femtocell cellular base station and the WAP is monitored by the building control system and responsive thereto, the building control system transmits commands to the cellular device via the femtocell cellular base station or the WAP.

2. The system of claim 1 wherein the building control system is one of a security system, an HVAC system, or a home entertainment system.

3. The system of claim 1 wherein the building control system includes a plurality of sensors, a control panel, and the local router.

4. The system of claim 3 wherein the building control system includes a broadband modem.

5. The system of claim 3 wherein at least one of the plurality of sensors comprises one of a gas detector, a smoke detector, a heat detector, a motion detector, a glass break detector or a door alarm sensor.

6. The system of claim 3 wherein at least one of the plurality of sensors includes a wireless sensor.

7. The system of claim 3 wherein the control panel includes a transceiver.

8. The system of claim 1 further comprising a first gateway, wherein the first gateway includes a macrocell base station that is coupled to the fixed local network via a GAN/UMA interface.

9. The system of claim 8 wherein the first gateway is coupled to a second gateway, and wherein the cellular device interfaces with the first gateway via the second gateway.

10. The system of claim 8 wherein the building control system is one of a security system, an HVAC system, or a home entertainment system, wherein the first gateway includes a macrocell base station that is coupled to the fixed local network via the GAN/UMA interface, wherein the first gateway is coupled to a second gateway, and wherein the cellular device interfaces with the first gateway via the second gateway.

11. The system of claim 1 wherein the fixed local network comprises one of a local area network, a wide area network, or the Internet.

12. The system of claim 1 wherein the cellular device includes at least two transceivers.

13. The system of claim 12 wherein at least one of the two transceivers includes a Wi-Fi® transceiver.

14. A method comprising:
   detecting a condition within a building;
   generating an alert signal indicative of the condition;
   transmitting the alert signal to one of a first gateway and a second gateway over a fixed network, the first gateway directly coupled to a femtocell cellular base station and a wireless access point (WAP) operating under an IEEE802.11 protocol, the femtocell cellular base station and the WAP being located within the building;
   monitoring data transmitted through the first gateway from the femtocell cellular base station and the WAP; and
   responsive thereto, wirelessly transmitting the alert signal to a cellular device via a wireless network, including one of the femtocell cellular base station and the WAP, wherein the first gateway interfaces the wireless network with the fixed network.

15. The method of claim 14 wherein wirelessly transmitting the alert signal to the cellular device includes transmitting the alert signal via one of radio waves, GPRS, or CDMA.

16. The method of claim 14 wherein detecting the condition includes one of detecting a level of gas, heat or smoke, detecting an activation or deactivation of an alarm, or detecting motion in a monitored area.

17. The method of claim 14 wherein the alert signal is transmitted wirelessly as one of SMS or data.

18. An apparatus comprising: a budding automation system which includes at least one router, a femtocell cellular base station directly coupled to the router and a wireless access point operating under an IEEE 802.11 protocol directly coupled to the router; and
   at least one fixed mobile convergence cellular device wherein the fixed mobile convergence cellular device directly with the building automation system via the femtocell cellular base station, the router, and a local area network, and wherein the fixed mobile convergence cellular device alternatively directly communicates with the building automation system via the wireless access point, the router, and the local area network.

\* \* \* \* \*